United States Patent
Wang et al.

(10) Patent No.: US 11,453,413 B2
(45) Date of Patent: Sep. 27, 2022

(54) DRIVING WARNING METHOD AND VEHICLE-MOUNTED DEVICE

(71) Applicant: Mobile Drive Technology Co., Ltd., New Taipei (TW)

(72) Inventors: Yu-Ching Wang, New Taipei (TW); Ting-Hao Chung, New Taipei (TW); Tzu-Kuei Huang, New Taipei (TW); Nai-Sheng Syu, New Taipei (TW); Chun-Hsiang Huang, New Taipei (TW); Sung-Chieh Chang, New Taipei (TW)

(73) Assignee: Mobile Drive Netherlands B.V., Amsterdam (NL)

( * ) Notice: Subject to any disclaimer, the term of this patent is extended or adjusted under 35 U.S.C. 154(b) by 12 days.

(21) Appl. No.: 16/940,377

(22) Filed: Jul. 27, 2020

(65) Prior Publication Data

US 2021/0155260 A1 May 27, 2021

(30) Foreign Application Priority Data

Nov. 22, 2019 (CN) .......................... 201911158240.3

(51) Int. Cl.
| H04N 5/44 | (2011.01) |
| B60W 50/14 | (2020.01) |
| B60W 30/09 | (2012.01) |
| B60W 30/095 | (2012.01) |
| B60W 40/09 | (2012.01) |

(52) U.S. Cl.
CPC ............ *B60W 50/14* (2013.01); *B60W 30/09* (2013.01); *B60W 30/0956* (2013.01); *B60W 40/09* (2013.01); *B60W 2050/143* (2013.01); *B60W 2540/225* (2020.02); *B60W 2554/4044* (2020.02)

(58) Field of Classification Search
CPC .. B60W 50/14; B60W 30/09; B60W 30/0956; B60W 40/09; B60W 2050/143; B60W 2540/225; B60W 2554/4044
See application file for complete search history.

(56) References Cited

U.S. PATENT DOCUMENTS

| 11,004,342 B2 * | 5/2021 | Tate ........................ G08G 1/005 |
| 2014/0092332 A1 * | 4/2014 | Price ...................... B60R 1/001 |
| | | 349/16 |

(Continued)

FOREIGN PATENT DOCUMENTS

| CN | 108198461 | 6/2018 |
| CN | 108369780 | 8/2018 |

(Continued)

*Primary Examiner* — Munear T Akki
(74) *Attorney, Agent, or Firm* — ScienBiziP, P.C.

(57) ABSTRACT

A driving warning method applied to a vehicle-mounted device is provided. The method includes detecting a moving object and a moving direction of the moving object by using at least one external sensor when a vehicle is moving. A driving behavior of a driver of the vehicle is monitored by using at least one internal sensor when the moving object and the moving direction of the moving object are detected. Once the moving direction of the moving object is not parallel to a moving direction of the vehicle and a sight direction of the driver does not cross the moving direction of the moving object, a first warning is transmitted.

18 Claims, 3 Drawing Sheets

(56) References Cited

U.S. PATENT DOCUMENTS

| | | | |
|---|---|---|---|
| 2016/0063761 A1* | 3/2016 | Sisbot | B60W 50/14 |
| | | | 345/633 |
| 2018/0362053 A1* | 12/2018 | Isa | B60R 1/00 |
| 2019/0213429 A1* | 7/2019 | Sicconi | G06F 3/0346 |
| 2019/0367038 A1* | 12/2019 | Fukumi | B60W 40/09 |
| 2020/0010081 A1* | 1/2020 | Yoon | B60W 30/09 |
| 2020/0047668 A1* | 2/2020 | Ueno | G08G 1/166 |
| 2020/0108826 A1* | 4/2020 | Kim | G08G 1/0104 |
| 2020/0109954 A1* | 4/2020 | Li | G05D 1/0278 |
| 2020/0302795 A1* | 9/2020 | Ohrenstein | G06F 3/013 |
| 2021/0122364 A1* | 4/2021 | Lee | G06K 9/6232 |

FOREIGN PATENT DOCUMENTS

| | | |
|---|---|---|
| CN | 108839653 | 11/2018 |
| CN | 108928294 A | 12/2018 |
| CN | 109817021 | 5/2019 |
| TW | 201815604 A | 5/2018 |
| TW | M586686 U | 11/2019 |

\* cited by examiner

DRIVING WARNING METHOD AND VEHICLE-MOUNTED DEVICE

FIELD

The present disclosure relates to traffic safety control technologies, in particular to a driving warning method, and a vehicle-mounted device.

BACKGROUND

With the popularity of vehicles, people use vehicles more and more frequently in their lives. In the process of implementing the present disclosure, the inventor found that traffic accidents generally occur when the driver is concentrating on one direction and so ignores people or vehicles coming from another direction. For example, the driver may concentrate on his rearview mirror for activity behind and make a turn without due care as to traffic and obstacles to the side and in front.

DETAILED DESCRIPTION

In order to provide a more clear understanding of the objects, features, and advantages of the present disclosure, the same are given with reference to the drawings and specific embodiments. It should be noted that the embodiments in the present disclosure and the features in the embodiments may be combined with each other without conflict.

In the following description, numerous specific details are set forth in order to provide a full understanding of the present disclosure. The present disclosure may be practiced otherwise than as described herein. The following specific embodiments are not to limit the scope of the present disclosure.

Unless defined otherwise, all technical and scientific terms herein have the same meaning as used in the field of the art technology as generally understood. The terms used in the present disclosure are for the purposes of describing particular embodiments and are not intended to limit the present disclosure.

Figure 1:
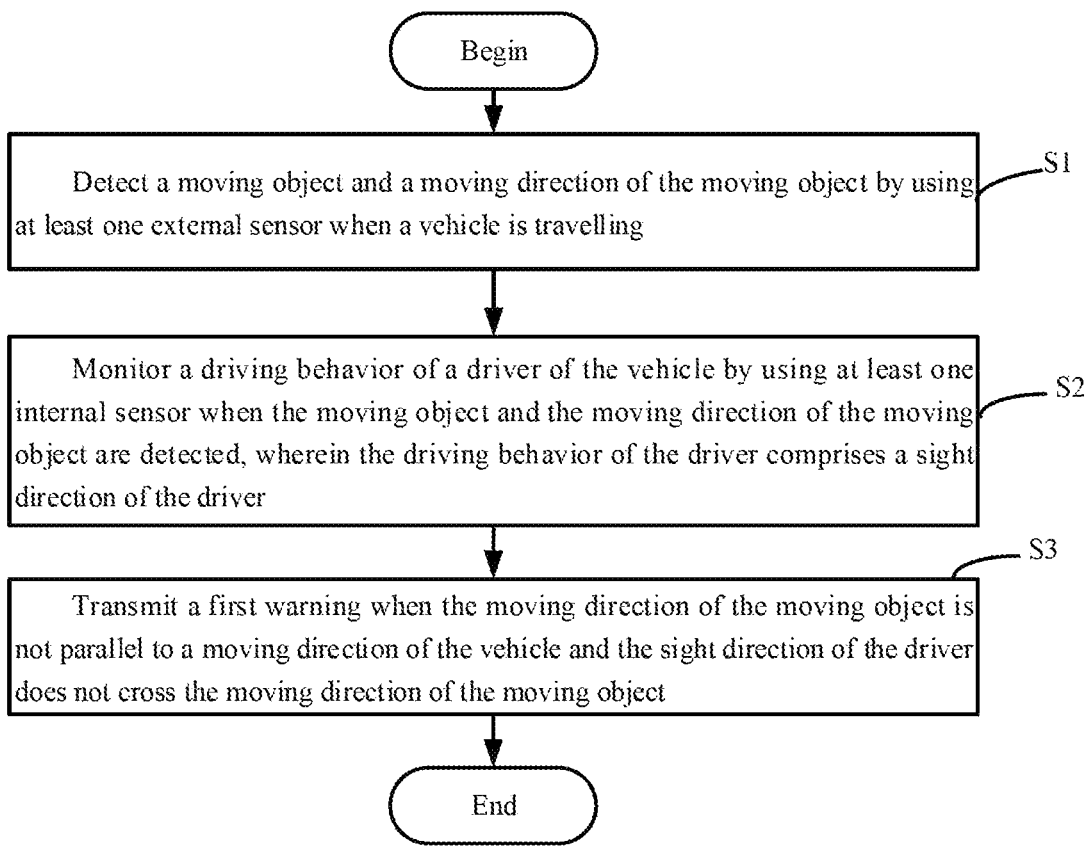
FIG. 1 shows a flowchart of one embodiment of a driving warning method of the present disclosure.

FIG. 1 shows a flowchart of one embodiment of a driving warning method of the present disclosure.

Figure 3:
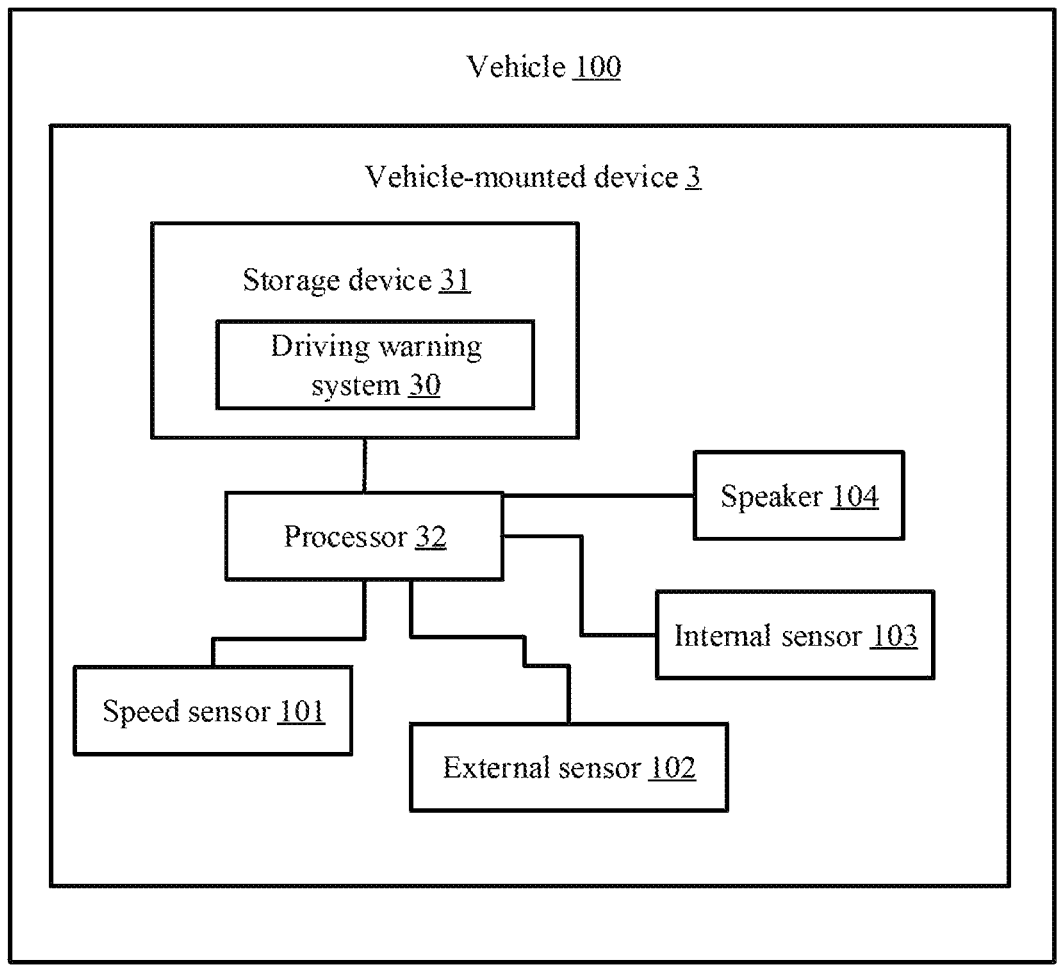
FIG. 3 shows a schematic block diagram of one embodiment of a vehicle-mounted device in a vehicle of the present disclosure.

In one embodiment, the driving warning method can be applied to a vehicle-mounted device (e.g., a vehicle-mounted device 3 in FIG. 3). For a vehicle-mounted device that needs to perform a driving warning, the function for the driving warning provided by the method of the present disclosure can be directly integrated on the vehicle-mounted device, or run on the vehicle-mounted device in the form of a software development kit (SDK).

At block S1, the vehicle-mounted device detects a moving object and a moving direction of the moving object by using at least one external sensor when a vehicle (e.g., a vehicle 100 in FIG. 3) is moving.

In this embodiment, the at least one external sensor is installed at a front/a roof of the vehicle.

In this embodiment, the at least one external sensor can recognize and monitor moving objects outside the vehicle while the vehicle is moving. The at least one external sensor can refer to a lidar or a camera.

In this embodiment, the moving objects can refer to other vehicles, pedestrians, etc. in a scanning range of the at least one external sensor.

In one embodiment, the vehicle-mounted device also identifies a distance between each of the moving objects and the vehicle, and a moving speed of each of the moving objects, by using the at least one external sensor.

In one embodiment, the vehicle-mounted device can further use an image recognition algorithm to identify a type of the moving object based on the image captured by the at least one external sensor. The type of the moving object includes a living body or a non-living body.

In one embodiment, the image recognition algorithm can be a template matching method.

At block S2, when the moving object and the moving direction of the moving object are detected, the vehicle-mounted device monitors a driving behavior of a driver of the vehicle by using at least one internal sensor. In one embodiment, the driving behavior includes a sight direction of the driver.

In one embodiment, the at least one internal sensor can be a camera.

In one embodiment, the at least one external sensor and the at least one internal sensor are separated arranged, and are oppositely arranged. The at least one external sensor and the at least one internal sensor are oppositely arranged meaning that the at least one external sensor is 180 degrees relative to the at least one internal sensor.

In other embodiments, the at least one external sensor is integrated with the at least one internal sensor, and the at least one external sensor is at a preset angle, such as 180 degrees, relative to the at least one internal sensor.

In one embodiment, the driving behavior of the driver further includes an action of the driver.

In one embodiment, the monitoring of the driving behavior of the driver by using the at least one internal sensor includes:

Capturing a video of the driver and identifying the driving behavior of the driver based on the video of the driver.

In one embodiment, the vehicle-mounted device can identify the driving behavior of the driver from the video by utilizing a deep learning-based human motion recognition algorithm.

In other embodiments, the vehicle-mounted device further determines whether a distance between the moving object and the vehicle is less than a preset value before using the at least one internal sensor to monitor the driving behavior of the driver. When the distance between the moving object and the vehicle is less than the preset value (for example, 10 meters), the vehicle-mounted device controls the at least one internal sensor to monitor the driving behavior of the driver. When the distance between the moving object and the vehicle is greater than or equal to the preset value, the vehicle-mounted device continues to use the at least one external sensor to detect the moving object and identify the type of the moving object. In other words, in the other embodiments, when the distance between the moving object and the vehicle is greater than or equal to the preset value, the vehicle-mounted device does not control the at least one internal sensor to monitor the driving behavior of the driver.

It should be noted that the preset value is an empirical value. Specifically, the preset value can be set according to actual conditions of the vehicle, such as a vehicle type of the vehicle, road conditions, and other factors. For example, the preset value set for a large vehicle may be different from the preset value set for a small vehicle.

In other embodiments, the vehicle-mounted device can adjust the preset value according to a driving speed of the vehicle. In one embodiment, a magnitude of the preset value is proportional to the driving speed of the vehicle.

At block S3, the vehicle-mounted device transmits a first warning when the moving direction of the moving object is not parallel to a moving direction of the vehicle and the sight direction of the driver does not cross the moving direction of the moving object.

In one embodiment, the vehicle-mounted device controls the vehicle to decelerate or brake when the first warning is transmitted.

In one embodiment, the vehicle-mounted device transmits a second warning (For example, the vehicle-mounted device transmits the second warning by controlling a speaker of the vehicle-mounted device to emit a warning sound) when the moving direction of the moving object is parallel to the moving direction of the vehicle and the sight direction of the driver does not cross the moving direction of the moving object.

In one embodiment, the first warning is different from the second warning.

In one embodiment, when the action of the driver is a specified action that affects driving safety, the vehicle-mounted device transmits the second warning.

In one embodiment, the vehicle-mounted device does not control the vehicle to decelerate when the second warning is transmitted.

In one embodiment, the specified action that affects driving safety includes an action of looking down at a mobile phone, an action of dozing off, an action of fiddle with hair, an action of at least one hand not on a steering wheel of the vehicle, and/or a combination thereof.

In other embodiments, when the action of the driver is the specified action that affects driving safety, and the moving object is the living body such as a pedestrian in a same lane as the vehicle, the vehicle-mounted device transmits the first warning and controls the vehicle to decelerate or brake.

In other embodiments, when the action of the driver is the specified action that affects driving safety, and the moving object is the non-living body such as another vehicle in the same lane as the vehicle, the vehicle-mounted device transmits the second warning.

In other embodiments, when the action of the driver is not the specified action that affects driving safety, and the moving object is not in the same lane as the vehicle, the vehicle-mounted device determines that there is no need to transmit a warning.

In one embodiment, the vehicle-mounted device determines whether the vehicle and the moving object are in the same lane according to a determining result of whether an angle of an azimuth of the moving object is within a preset angle range.

Specifically, when the angle of the azimuth of the moving object is within the preset angle range, the vehicle-mounted device determines that the vehicle and the moving object are not in the same lane. When the angle of the azimuth of the moving object is not within the preset angle range, the vehicle-mounted device determines that the vehicle and the moving object are in the same lane.

In this embodiment, the preset angle range may refer to a range of the angle of the azimuth of the moving object when the moving object and the vehicle are not in the same lane. The preset angle range may be set according to experience, and may be specifically set by the user according to the type of the vehicle and a width of the lane.

In other embodiments, the vehicle-mounted device determines whether the vehicle and the moving object are in the same lane using a high-precision map of the vehicle-mounted device.

According to the above records, the driving warning method according to the embodiment of the present disclosure can improve driving safety during driving.

Figure 2:
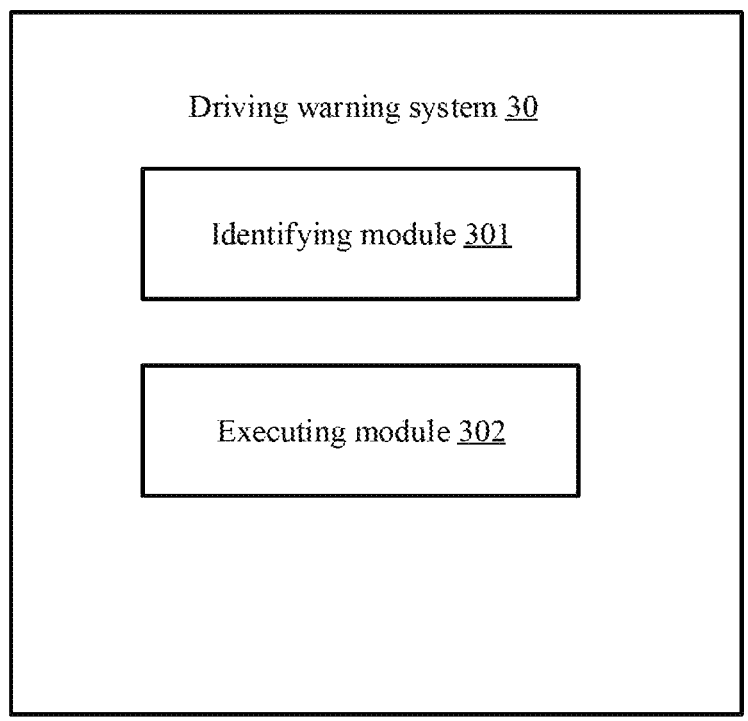
FIG. 2 shows a schematic block diagram of one embodiment of modules of a driving warning system of the present disclosure.

FIG. 2 shows a schematic block diagram of an embodiment of modules of a driving warning system 30 of the present disclosure.

In some embodiments, the driving warning system 30 runs in a vehicle-mounted device. The driving warning system 30 may include a plurality of modules. The plurality of modules can comprise computerized instructions in a form of one or more computer-readable programs that can be stored in a non-transitory computer-readable medium (e.g., a storage device 31 of the vehicle-mounted device 3 in FIG. 3), and executed by at least one processor (e.g., a processor 32 in FIG. 3) of the vehicle-mounted device to implement driving warning function (described in detail in FIG. 1).

In at least one embodiment, the driving warning system 30 may include a plurality of modules. The plurality of modules may include, but is not limited to, an identifying module 301 and an executing module 302. The modules 301-302 can comprise computerized instructions in the form of one or more computer-readable programs that can be stored in the non-transitory computer-readable medium (e.g., the storage device 31 of the vehicle-mounted device 3), and executed by the at least one processor (e.g., a processor 32 in FIG. 3) of the vehicle-mounted device to implement driving warning function (e.g., described in detail in FIG. 1).

The identifying module 301 detects a moving object and a moving direction of the moving object by using at least one external sensor when a vehicle (e.g., a vehicle 100 in FIG. 3) is moving.

In this embodiment, the at least one external sensor is installed at a front/a roof of the vehicle.

In this embodiment, the at least one external sensor can recognize and monitor moving objects outside the vehicle while the vehicle is moving. The at least one external sensor can refer to a lidar or a camera.

In this embodiment, the moving objects can refer to other vehicles, pedestrians, etc. in a scanning range of the at least one external sensor.

In one embodiment, the identifying module 301 also identifies a distance between each of the moving objects and the vehicle, and a moving speed of each of the moving objects, by using the at least one external sensor.

In one embodiment, the identifying module 301 can further use an image recognition algorithm to identify a type of the moving object based on the image captured by the at least one external sensor. The type of the moving object includes a living body or a non-living body.

In one embodiment, the image recognition algorithm can be a template matching method.

When the moving object and the moving direction of the moving object are detected, the executing module 302 monitors a driving behavior of a driver of the vehicle by using at least one internal sensor. In one embodiment, the driving behavior includes a sight direction of the driver.

In one embodiment, the at least one internal sensor can be a camera.

In one embodiment, the at least one external sensor and the at least one internal sensor are separated arranged, and are oppositely arranged. The at least one external sensor and the at least one internal sensor are oppositely arranged meaning that the at least one external sensor is 180 degrees relative to the at least one internal sensor.

In other embodiments, the at least one external sensor is integrated with the at least one internal sensor, and the at least one external sensor is at a preset angle, such as 180 degrees, relative to the at least one internal sensor.

In one embodiment, the driving behavior of the driver further includes an action of the driver.

In one embodiment, the monitoring of the driving behavior of the driver by using the at least one internal sensor includes:

Capturing a video of the driver and identifying the driving behavior of the driver based on the video of the driver.

In one embodiment, the executing module 302 can identify the driving behavior of the driver from the video by utilizing a deep learning-based human motion recognition algorithm.

In other embodiments, the executing module 302 further determines whether a distance between the moving object and the vehicle is less than a preset value before using the at least one internal sensor to monitor the driving behavior of the driver. When the distance between the moving object and the vehicle is less than the preset value (for example, 10 meters), the executing module 302 controls the at least one internal sensor to monitor the driving behavior of the driver. When the distance between the moving object and the vehicle is greater than or equal to the preset value, the executing module 302 continues to use the at least one external sensor to detect the moving object and identify the type of the moving object. In other words, in the other embodiments, when the distance between the moving object and the vehicle is greater than or equal to the preset value, the executing module 302 does not control the at least one internal sensor to monitor the driving behavior of the driver.

It should be noted that the preset value is an empirical value. Specifically, the preset value can be set according to actual conditions of the vehicle, such as a vehicle type of the vehicle, road conditions, and other factors. For example, the preset value set for a large vehicle may be different from the preset value set for a small vehicle.

In other embodiments, the executing module 302 can adjust the preset value according to a driving speed of the vehicle. In one embodiment, a magnitude of the preset value is proportional to the driving speed of the vehicle.

The executing module 302 transmits a first warning when the moving direction of the moving object is not parallel to a moving direction of the vehicle and the sight direction of the driver does not cross the moving direction of the moving object.

In one embodiment, the executing module 302 controls the vehicle to decelerate or brake when the first warning is transmitted.

In one embodiment, the executing module 302 transmits a second warning (For example, the executing module 302 transmits the second warning by controlling a speaker of the executing module 302 to emit a warning sound) when the moving direction of the moving object is parallel to the moving direction of the vehicle and the sight direction of the driver does not cross the moving direction of the moving object.

In one embodiment, the first warning is different from the second warning.

In one embodiment, when the action of the driver is a specified action that affects driving safety, the executing module 302 transmits the second warning.

In one embodiment, the executing module 302 does not control the vehicle to decelerate when the second warning is transmitted.

In one embodiment, the specified action that affects driving safety includes an action of looking down at a mobile phone, an action of dozing off, an action of fiddle with hair, an action of at least one hand not on a steering wheel of the vehicle, and/or a combination thereof.

In other embodiments, when the action of the driver is the specified action that affects driving safety, and the moving object is the living body such as a pedestrian in a same lane as the vehicle, the executing module 302 transmits the first warning and controls the vehicle to decelerate or brake.

In other embodiments, when the action of the driver is the specified action that affects driving safety, and the moving object is the non-living body such as another vehicle in the same lane as the vehicle, the executing module 302 transmits the second warning.

In other embodiments, when the action of the driver is not the specified action that affects driving safety, and the moving object is not in the same lane as the vehicle, the executing module 302 determines that there is no need to transmit a warning.

In one embodiment, the executing module 302 determines whether the vehicle and the moving object are in the same lane according to a determining result of whether an angle of an azimuth of the moving object is within a preset angle range.

Specifically, when the angle of the azimuth of the moving object is within the preset angle range, the executing module 302 determines that the vehicle and the moving object are not in the same lane. When the angle of the azimuth of the moving object is not within the preset angle range, the executing module 302 determines that the vehicle and the moving object are in the same lane.

In this embodiment, the preset angle range may refer to a range of the angle of the azimuth of the moving object when the moving object and the vehicle are not in the same lane. The preset angle range may be set according to experience, and may be specifically set by the user according to the type of the vehicle and a width of the lane.

In other embodiments, the executing module 302 determines whether the vehicle and the moving object are in the same lane using a high-precision map of the vehicle-mounted device.

FIG. 3 shows a schematic block diagram of one embodiment of a vehicle-mounted device 3 in a vehicle 100. The vehicle-mounted device 3 is installed in the vehicle 100. The vehicle 100 can be a car or a locomotive. In an embodiment, the vehicle-mounted device 3 may include, but is not limited to, a speed sensor 101, at least one external sensor 102, at least one internal sensor 103, a speaker 104, etc. The driving warning system 30 is used to warn the driver of driving safety during driving (details will be described later).

In this embodiment, the speed sensor 101 can detect a driving speed of the vehicle 100.

The external sensor 102 can monitor moving objects outside the vehicle 100. The external sensor 102 can refer to a laser radar or a camera. The moving objects outside the vehicle 100 can refer to other vehicles, pedestrians, etc. in a scanning range of the external sensor 102.

The internal sensor 103 can be a camera that captures images or videos of the driver of the vehicle 100.

In one embodiment, the external sensor 102 and the internal sensor 103 are separated arranged and are relatively arranged. The external sensor 102 and the internal sensor 103 are relatively arranged means that the external sensor 102 is 180 degrees relative to the internal sensor 103.

In one embodiment, the external sensor 102 is integrated with the internal sensor 103, and the external sensor 102 is at a preset angle, such as 180 degrees, relative to the internal sensor 103.

The speaker 104 can be used to output sound effects. In this embodiment, the vehicle-mounted device 3 further includes a storage device 31 and at least one processor 32 which are electrically connected to each other.

It should be understood by those skilled in the art that the structure of the vehicle-mounted device 3 shown in FIG. 3 does not constitute a limitation of the embodiment of the present disclosure. The vehicle-mounted device 3 may further include other hardware or software, or the vehicle-mounted device 3 may have different component arrangements. For example, the vehicle-mounted device 3 can further including a display device.

In at least one embodiment, the vehicle-mounted device 3 may include a terminal that is capable of automatically performing numerical calculations and/or information processing in accordance with pre-set or stored instructions. The hardware of terminal can include, but is not limited to, a microprocessor, an application specific integrated circuit, programmable gate arrays, digital processors, and embedded devices.

It should be noted that the vehicle-mounted device 3 is merely an example, and other existing or future electronic products may be included in the scope of the present disclosure, and are included in the reference.

In some embodiments, the storage device 31 can be used to store program codes of computer readable programs and various data, such as the driving warning system 30 installed in the vehicle-mounted device 3, and automatically access to the programs or data with high speed during the running of the vehicle-mounted device 3. The storage device 31 can include a read-only memory (ROM), a random access memory (RAM), a programmable read-only memory (PROM), an erasable programmable read only memory (EPROM), an one-time programmable read-only memory (OTPROM), an electronically-erasable programmable read-only memory (EEPROM)), a compact disc read-only memory (CD-ROM), or other optical disk storage, magnetic disk storage, magnetic tape storage, or any other storage medium readable by the vehicle-mounted device 3 that can be used to carry or store data.

In some embodiments, the at least one processor 32 may be composed of an integrated circuit, for example, may be composed of a single packaged integrated circuit, or multiple integrated circuits of same function or different functions. The at least one processor 32 can include one or more central processing units (CPU), a microprocessor, a digital processing chip, a graphics processor, and various control chips. The at least one processor 32 is a control unit of the vehicle-mounted device 3, which connects various components of the vehicle-mounted device 3 using various interfaces and lines. By running or executing a computer program or modules stored in the storage device 31, and by invoking the data stored in the storage device 31, the at least one processor 32 can perform various functions of the vehicle-mounted device 3 and process data of the vehicle-mounted device 3. For example, the function of performing the driving warning.

Although not shown, the vehicle-mounted device 3 may further include a power supply (such as a battery) for powering various components. Preferably, the power supply may be logically connected to the at least one processor 32 through a power management device, thereby, the power management device manages functions such as charging, discharging, and power management. The power supply may include one or more a DC or AC power source, a recharging device, a power failure detection circuit, a power converter or inverter, a power status indicator, and the like. The vehicle-mounted device 3 may further include various sensors, such as a BLUETOOTH module, a Wi-Fi module, and the like, and details are not described herein.

In at least one embodiment, as shown in FIG. 2, the at least one processor 32 can execute various types of applications (such as the driving warning system 30) installed in the vehicle-mounted device 3, program codes, and the like. For example, the at least one processor 32 can execute the modules 301-302 of the driving warning system 30.

In at least one embodiment, the storage device 31 stores program codes. The at least one processor 32 can invoke the program codes stored in the storage device to perform functions. For example, the modules described in FIG. 2 are program codes stored in the storage device 31 and executed by the at least one processor 32, to implement the functions of the various modules for the purpose of realizing the driving warning as described in FIG. 1.

In at least one embodiment, the storage device 31 stores one or more instructions (i.e., at least one instruction) that are executed by the at least one processor 32 to achieve the purpose of realizing the driving warning as described in FIG. 1.

In at least one embodiment, the at least one processor 32 can execute the at least one instruction stored in the storage device 31 to perform the operations of as shown in FIG. 1.

The above description is only embodiments of the present disclosure and is not intended to limit the present disclosure, and various modifications and changes can be made to the present disclosure. Any modifications, equivalent substitutions, improvements, etc. made within the spirit and scope of the present disclosure are intended to be included within the scope of the present disclosure.

What is claimed is:

1. A driving warning method applied to a vehicle-mounted device, the driving warning method comprising:
    detecting a moving object and a moving direction of the moving object by using at least one external sensor when a vehicle is moving;
    monitoring a driving behavior of a driver of the vehicle by using at least one internal sensor when the moving object and the moving direction of the moving object are detected, wherein the driving behavior of the driver comprises a sight direction of the driver; and
    transmitting a first warning when the moving direction of the moving object is not parallel to a moving direction of the vehicle and the sight direction of the driver does not cross the moving direction of the moving object,
    determining whether the vehicle and the moving object are in a same lane according to a determining result of whether an angle of an azimuth of the moving object is within a preset angle range.

2. The driving warning method as claimed in claim 1, further comprising:
   transmitting a second warning when the moving direction of the moving object is parallel to the moving direction of the vehicle and the sight direction of the driver does not cross the moving direction of the moving object.

3. The driving warning method as claimed in claim 2, wherein the first warning is different from the second warning.

4. The driving warning method as claimed in claim 1, further comprising:
   controlling the vehicle to decelerate or brake when the first warning is transmitted.

5. The driving warning method as claimed in claim 1, wherein the monitoring the driving behavior of the driver of the vehicle comprises:
   capturing a video of the driver; and
   identifying the driving behavior of the driver based on the video of the driver.

6. The driving warning method as claimed in claim 5, wherein the monitoring the driving behavior of the driver is performed when a distance between the moving object and the vehicle is less than a preset value.

7. The driving warning method as claimed in claim 6, further comprising:
   adjusting the preset value according to a driving speed of the vehicle.

8. The driving warning method as claimed in claim 1, further comprising:
   determining whether the vehicle and the moving object are in a same lane by using a high-precision map of the vehicle-mounted device.

9. The driving warning method as claimed in claim 1, further comprising:
   identifying a type of the moving object based on an image captured by the at least one external sensor using an image recognition algorithm.

10. A vehicle-mounted device comprising:
    a storage device;
    at least one processor; and
    the storage device storing one or more programs, which when executed by the at least one processor, cause the at least one processor to:
    detect a moving object and a moving direction of the moving object by using at least one external sensor when a vehicle is moving;
    monitor a driving behavior of a driver of the vehicle by using at least one internal sensor when the moving object and the moving direction of the moving object are detected, wherein the driving behavior of the driver comprises a sight direction of the driver; and
    transmit a first warning when the moving direction of the moving object is not parallel to a moving direction of the vehicle and the sight direction of the driver does not cross the moving direction of the moving object,
    determine whether the vehicle and the moving object are in a same lane according to a determining result of whether an angle of an azimuth of the moving object is within a preset angle range.

11. The vehicle-mounted device as claimed in claim 10, further comprising:
    transmit a second warning when the moving direction of the moving object is parallel to the moving direction of the vehicle and the sight direction of the driver does not cross the moving direction of the moving object, wherein the first warning is different from the second warning.

12. The vehicle-mounted device as claimed in claim 10, wherein the at least one external sensor and the at least one internal sensor are separated arranged and are oppositely arranged.

13. The vehicle-mounted device as claimed in claim 10, wherein the at least one external sensor is integrated with the at least one internal sensor, and the at least one external sensor is 180 degrees relative to the at least one internal sensor.

14. The vehicle-mounted device as claimed in claim 10, wherein the monitoring the driving behavior of the driver of the vehicle comprises:
    capture a video of the driver; and
    identify the driving behavior of the driver based on the video of the driver.

15. The vehicle-mounted device as claimed in claim 14, wherein the monitoring the driving behavior of the driver is performed when a distance between the moving object and the vehicle is less than a preset value.

16. The vehicle-mounted device as claimed in claim 15, further comprising:
    adjust the preset value according to a driving speed of the vehicle.

17. The vehicle-mounted device as claimed in claim 10, further comprising:
    determine whether the vehicle and the moving object are in a same lane by using a high-precision map of the vehicle-mounted device.

18. The vehicle-mounted device as claimed in claim 10, further comprising:
    identify a type of the moving object based on an image captured by the at least one external sensor using an image recognition algorithm.

* * * * *